United States Patent [19]

Davis et al.

[11] 4,205,103

[45] May 27, 1980

[54] PROCESS USING SAME STABLE FOAM LATEX WITH BUILT-IN SELF GEL MECHANISM AND COATING

[75] Inventors: Joseph P. Davis, Akron, Ohio; Julius S. Nagy, Calhoun, Ga.

[73] Assignee: The Goodyear Tire & Rubber Company, Akron, Ohio

[21] Appl. No.: 577,491

[22] Filed: May 14, 1975

[51] Int. Cl.² .................. B01J 13/00; B05D 3/02
[52] U.S. Cl. .................. 427/373; 252/316; 252/DIG. 7; 521/65; 521/139
[58] Field of Search ........ 252/316, DIG. 7, DIG. 13; 260/2.5 L; 427/342, 373; 521/65

[56] References Cited

U.S. PATENT DOCUMENTS

| | | | |
|---|---|---|---|
| 2,261,439 | 11/1941 | Kelly, Jr. | 260/2.5 L |
| 2,568,457 | 9/1951 | Meyer | 260/2.5 L X |
| 3,304,262 | 2/1967 | Corey | 252/316 X |
| 3,658,985 | 4/1972 | Olson, Jr. et al. | 252/153 X |
| 3,755,559 | 8/1973 | Hewitt | 252/DIG. 13 |

FOREIGN PATENT DOCUMENTS 892522  2/1972  Canada .................. 260/2.5 L

*Primary Examiner*—Richard D. Lovering
*Attorney, Agent, or Firm*—J. A. Rozmajzl

[57] ABSTRACT

A heat sensitive, but stable, gellant system is added to a foam latex during manufacture of the latex or as an additive ingredient being incorporated at the time of preparing the liquid foam compound. The system is comprised of an amphoteric surfactant acid or an amphoteric surfactant acid neutralized with a fixed alkali, said surfactant being capable of both sensitizing the latex emulsifier and functioning as a stabilizer; a water soluble ionizable organic or inorganic acid capable of activating the gelation mechanism and a water soluble, volatile, organic or inorganic base which is added in an amount sufficient to neutralize the combination of the surfactant and the acid to a pH of 8 to 12.

5 Claims, No Drawings

PROCESS USING SAME STABLE FOAM LATEX WITH BUILT-IN SELF GEL MECHANISM AND COATING

This invention relates to compositions for a built-in or self-contained gellant which can be incorporated into a suitable foam latex without causing destabilization or any other loss of latex storage life for extended periods of time.

A number of agents for chemically gelling latex foam are known. In general, these chemicals rely on the gelling of the semi-liquid viscous foam to form a solid cellular structure upon drying and vulcanizing. The mechanism of gelling must be carefully monitored and controlled. Gelation of the foam can result from the hydrolysis of relatively insoluble acid forming chemicals such as the ammonium, sodium or potassium salts of the silico-fluorides. Gelation of the foam can also result from the decomposition of suitable heat sensitive ammonium salts such as the sulfates, nitrates, chlorides, thiocyanates, formates and acetates. As is known to those skilled in the art, the incorporation of hydrolyzable electrolytes or heat sensitive ammonium salts is normally done after compounding and frothing of the liquid foam. These gellants are carefully metered into the froth after foaming, but before spreading the foam on carpet or other textile substrate if such is the ultimate use. The gellants of prior art must be pumped or otherwise injected into a viscous froth using a separate gel pump and then thoroughly mixed into the froth to insure uniform distribution of the gellant. In the absence of the correct level of the gellant or its heterogeneous distribution in the froth, the resulting foam rubber would be of unacceptable quality. The quality defects in the finished foam could be due to any or all of the following: poor foam rubber structure, surface cracks, excessive shrinkage and poor foam strength. There is a need in the art for a stable, built-in or self-contained gel system which eliminates the need for separate gel pumps and metering devices thereby simplifying the method of foam gelation.

An object of this invention is to provide a gellant composition which is heat sensitive, can be incorporated into the foam latex or finished foam compound, does not cause latex destabilization during storage and eliminates the need for separate devices for adding the foam gellant. Other objects will become apparent as the description proceeds.

The objects of the present invention are accomplished by the use of a gelation system comprising an amphoteric surfactant acid or an amphoteric surfactant acid neutralized with a fixed alkali to a pH of 5 to 7.5, said surfactant being capable of both sensitizing the latex emulsifier and functioning as a stabilizer; a water soluble, ionizable, organic or inorganic acid (hereinafter referred to as acid) capable of activating the gelation mechanism and a water soluble, volatile, organic or inorganic base which is added in an amount sufficient to neutralize the combination of the surfactant and the acid to a pH of 8 to 12.

By amphoteric surfactant is meant a surfactant having the capacity of behaving either as a cationic or anionic surfactant. In acidic media, the agent is cationic by virtue of its positive charge; in an alkaline solution, the agent is anionic by virtue of its negative charge.

By water soluble ionizable-organic or inorganic acid is meant that the acids should be soluble to the extent of at least ten grams per hundred grams of water at 25° C. and have a pH dissociation constant of five or less at 25° C.

By water-soluble volatile organic or inorganic base is meant that the base should be water soluble to the extent of at least 5.5 grams per hundred grams of water at 20° C. By volatile is meant having a boiling point range of $-33°$ C. to 180° C. at 760 mm.

The following illustrate but do not limit the compounds which can be used in the present gellant system. The amphoteric surfactant includes N-coco-$\beta$-aminopropionic acid, N-lauryl myristyl-$\beta$-aminopropionic acid, sodium N-coco-$\beta$-aminopropionate, disodium N-lauryl-$\beta$-aminodipropionate and the partial sodium salt of N-lauryl-$\beta$-iminodipropionic acid. The base includes ammonia, methylamine, dimethylamine, ethylamine, diethylamine, monoethanolamine and morpholine. The acid includes sulfuric acid, hydrochloric acid, phosphoric acid, acetic acid, para-toluene sulfonic acid and sulfamic acid.

The heat sensitivity of the self-gel mechanism may be controlled by adjusting the ratios of the water-soluble ionizable organic or inorganic acid, the amphoteric surfactant acid, the amount and boiling point range of the water-soluble organic or inorganic base in the gellant. For example, the heat sensitivity of the self-gel mechanism can be increased by increasing the level of the ionizable acid or by using a more volatile base. It is also known to those skilled in the art that the heat sensitivity of the gellants in the foam compound may be altered by the temperature of the compound, the addition of alkaline materials, synthetic surfactants, soaps and dispersing agents during the preparation, storage or spreading of the foam compound.

The gellant system of the present system is used with pH sensitive latices emulsified with fatty acid soaps or rosin acid soaps, i.e., the sodium or potassium salts of fatty acids and rosin acids or combinations thereof. The elastomeric latices used in the process of this invention are broadly described as aqueous colloidal dispersions of natural or synthetic rubber. Synthetic rubbers include homopolymers of butadiene, isoprene or dimethyl butadiene; copolymers of butadiene and styrene, isoprene and styrene, butadiene and dimethyl butadiene, butadiene and acrylonitrile, isoprene and acrylonitrile, dimethyl butadiene and styrene, butadiene and vinyl toluene, isoprene and vinyl toluene, interpolymers of butadiene, styrene and an ethylenically unsaturated mono or dicarboxylic acid. Preferred are the emulsion polymerized copolymer latices of butadiene and styrene, isoprene and styrene and natural rubber latex or blends of any of the above synthetic rubber latices with natural rubber latex.

The gellant system of the present system can be used with latices from which are prepared carpet underlay or carpet cushioning. The gelation system is added to the latex during manufacture or may be added at any point during compounding of the liquid foam.

The amount of gellant components by weight per hundred parts by weight of latex solids varies from 0.25 to 5.0 parts by weight of the amphoteric surfactant, 0.25 to 5.0 parts by weight of the acid and 0.5 to 7.5 parts by weight of the base.

Latex solids will normally vary from 55 to 72 weight percent, but can vary from 45 to 74 weight percent.

The amount of gelation system naturally will vary depending upon the amount of emulsifier used in the preparation of the polymer latex and the auxiliary surfactants, dispersants and alkaline materials used during compounding of the liquid foam.

The amphoteric surfactant acid and water soluble, ionizable acid can be added to the latex separately or in combination. If added individually, their individual pH must be adjusted with the base to a pH of 8 to 12. If they are added in combination, the pH of the combination must be adjusted with the base to a value of 8 to 12 for addition to the latex.

In preparing the self gellant system of the present invention the order of addition of the components of the system is not critical to the performance of the invention if the following guidelines are followed. The gellant can be added to the latex either during the manufacture of the latex or when compounding the latex with non-curatives or thereafter so long as the addition is made before the addition of the curatives.

It is advantageous to follow an order of addition which insures rapid and complete solubility, dissipation of heat of the solution and a predictable pH value. For example, it is desirable to start with softened water to which a predetermined amount of the base has been added in order to achieve the final gellant pH of 8 to 12 and to combine the basic aqueous solution first with the water soluble, ionizable acid and then with the amphoteric surfactant acid or its fixed alkali counterpart. By fixed alkali counterpart is meant that the surfactant acid can be reacted to a pH of 5 to 7.5 with a fixed alkali, such as potassium hydroxide, and remain operable so long as the final pH adjustment is made into the range of 8 to 12 with a water-soluble, volatile base. The pH of the self-gellant is then best held in a range of 8 to 12 to prevent the destabilization of the latex or foam compound to which it is subsequently added. If desired, the surfactant acid or its fixed alkali counterpart can be combined with the ionizable acid and this combination mixed with the base. Or the surfactant acid can be mixed with the portion of the base and the ionizable acid mixed with the remainder of the base and the two acids added separately to the latex.

The gellant system of the present invention will not cause premature or uncontrolled gellation upon its addition to the latex or foamed compound, i.e., the latex containing non-curative ingredients. The gellation system is activated during the drying and vulcanization of the foam to convert the semi-liquid viscous froth to a porous cellular solid foam suitable for use as a carpet underlay.

The ingredients of the gellant system can be added in any of the conventional ways. For example, water soluble materials can be added as aqueous solutions, solids as dispersions, liquids as emulsions, etc.

The following examples illustrate but do not limit the practice of the present invention.

EXAMPLE 1

One hundred dry parts by weight of synthetic cold SBR rubber latex designed for foam use was combined with a self-gellant of the following compositions:

| Ingredients | Parts by Weight |
| --- | --- |
| Water | 4.6 |
| Ammonia (28%) | 3.5 |
| Sulfamic Acid 100% | 1.5 |
| N-coco-$\beta$-aminopropionic acid (45%) | 2.2 |

The pH of the above self-gellant system was 10.0. The above gellant was readily incorporated into the latex with no evidence of latex instability. The latex containing the above gellant was then compounded in the following manner:

| Total Solids | Ingredients | Parts by Weight Dry | wet |
| --- | --- | --- | --- |
| | Part A | | |
| 66.5 | Self-Gel Latex | 100.00 | 150.00 |
| 18 | Potassium Oleate | 2.00 | 11.10 |
| 20 | Tetrapotassium Pyrophosphate | 0.25 | 1.25 |
| 28 | Ammonia | — | 2.00 |
| 25 | Styrene Maleic Anhydride Resin Ammonia Neutralized | 1.00 | 4.00 |
| 100 | Feldspar | 100.00 | 100.00 |
| 100 | Hydrated Alumina | 50.00 | 50.00 |
| — | Water | — | 15.00 |
| | | 253.25 | 333.35 |
| | Part B | | |
| 50 | Wingstay L (Phenolic Antioxidant) | 1.00 | 2.00 |
| 50 | Zinc Oxide | 3.00 | 6.00 |
| 62.5 | Sulfur | 1.75 | 2.80 |
| 50 | Zinc Diethyldithiocarbamate | 1.00 | 2.00 |
| 50 | Zinc 2-Mercaptobenzothiazole | 1.50 | 3.00 |
| | | 8.25 | 15.80 |
| | Total Compound solids 74.5% | 261.50 | 349.15 |

The total solids content of the foam compound is advantageously maintained in a range of 60 to 80 percent. The working solids content should be as high as practical to insure good gelling behavior and not so high as to result in a froth too viscous to spread without causing poor spreading at normal doctoring speeds.

The ingredients described in part A were combined in the order shown with good mixing to disperse the fillers. The ingredients shown in part B were combined with mixing and then all of part B was added to part A, again with agitation, to produce the completed latex foam compound.

After foaming the above compound in a laboratory mixer to introduce approximately four volumes of air to one volume of compound, the foam was spread to a thickness of about 4.75 millimeters on a jute substrate and placed in a radiant heat chamber held at 178° C. for 10 seconds to set the surface, transferred to a hot air oven for 30 minutes at 138° C. for drying and curing. The resultant foam had a smooth surface skin and a uniform small cell structure suitable for carpet underlay. The foam appearance indicated that the gellant of this invention had good heat sensitivity. The frothed compound air gelled in 6½ minutes.

EXAMPLE 2

The self-gel latex was produced according to the sample formulation and procedure as described in Example 1, except that 1.25 parts of monoethanolamine were used in place of 3.50 parts of 28 percent ammonia and the difference was added as water. The pH of the gellant was 9.00. The gellant was added to the latex as described in Example 1. There was no evidence of instability. The latex containing the self-gel ingredients was compounded, frothed, spread and cured as described in Example 1. A good cell structure and surface was obtained indicating good heat sensitivity. The frothed compound did not air gel.

EXAMPLE 3

The self-gel latex was produced according to the sample formulation and procedure as described in Example 1 except that the N-coco-β-aminopropionic acid was replaced with sodium N-coco-β-aminopropionate on an equivalent activity basis and 1.25 parts of monoethanolamine were used in place of the 3.50 parts of 28 percent ammonia and the difference added as water. The pH of the self-gel stabilizer was 9.25. The gellant was added to the latex as described in Example 1. There was no evidence of latex instability. The latex containing the self-gel ingredients was compounded, frothed, spread and cured as described in Example 1. A good cell structure and surface was obtained indicating good heat sensitivity. The frothed compound did not air gel.

EXAMPLE 4

The self-gel latex was produced according to the sample formulation and procedure described in Example 1 except that a fixed alkali, e.g., potassium hydroxide, was reacted with the N-coco-β-aminopropionic acid to a pH of 5 to 7.5 and the 28 percent ammonia was replaced with 1.25 parts monoethanolamine to adjust to a final pH of 9.0. The gellant was added to the latex as described in Example 1. There was no evidence of latex instability. The latex containing the self-gel ingredients was compounded, frothed, spread and cured as described in Example 1. A good cell structure and surface was obtained indicating good heat sensitivity. The frothed compound did not air gel.

EXAMPLE 5

The self-gel stabilizer described in Example 1 was incorporated into part B of the foam compound. Part A was then mixed with part B. There was no evidence of instability. The compound was frothed, spread and cured as described in Example 1. A good cell structure and surface was obtained indicating good heat sensitivity. The frothed compound would air gel.

EXAMPLE 6

The self-gel stabilizer described in Example 1 was incorporated into the foam compound after mixing part A and part B. There was no evidence of instability. The compound was frothed, spread and cured as described in Example 1. A good cell structure and surface was obtained indicating good heat sensitivity. The frothed compound would air gel.

EXAMPLE 7

The self-gel stabilizer described in Example 1 was incorporated into part A of the compound and then part B was mixed with part A. There was no evidence of instability. The compound was frothed, spread and cured as described in Example 1. A good cell structure and surface was obtained indicating good heat sensitivity. The frothed compound would air gel.

EXAMPLE 8

The self-gel stabilizer described in Example 1 was incorporated into part B of the compound and then part B was mixed with part A. There was no evidence of instability. The compound was frothed, spread and cured as described in Example 1. A good cell structure and surface was obtained indicating good heat sensitivity. The frothed compound would air gel.

While certain representative embodiments and details have been shown for the purpose of illustrating the invention, it will be apparent to those skilled in this art that various changes and modifications may be made therein without departing from the spirit or scope of the invention.

We claim:

1. A heat sensitive stable gellant system comprising (A) an amphoteric surfactant acid, (B) an ionizable acid, and (C) a water soluble volatile base having a boiling point range of $-33°$ C. to $180°$ C. at 760 millimeters wherein the amount of the base is sufficient to result in a total gellant system pH of from 8 to 12 wherein the weight ratio of amphoteric surfactant to acid to base is 0.25–5.0/0.25–5.0/0.5–7.5.

2. A heat sensitive stable foam rubber latex containing the gellant system of claim 1 wherein the amount of amphoteric surfactant acid is 0.25 to 5.0 parts and the amount of ionizable acid is 0.25 to 5.0 parts, all parts being parts by weight per 100 parts by weight of latex solids.

3. A process for producing a porous cellular solid foam from a rubber latex comprising adding the gellant system of claim 1 to a rubber latex prior to the addition of the vulcanization agents, foaming the latex, spreading the froth on a suitable textile substrate, drying the froth to form a foam and vulcanizing the foam wherein the amount of amphoteric surfactant acid is 0.25 to 5.0 parts and the amount of ionizable acid is 0.25 to 5.0 parts, all parts being parts by weight per 100 parts by weight of latex solids.

4. The process of claim 3 wherein the amphoteric surfactant acid and ionizable acid are added to the latex separately each acid containing a portion of the base so that both components have a pH in the range of from 8 to 12.

5. The process of claim 3 wherein the amphoteric surfactant acid, the ionizable acid and the water soluble volatile base are all combined together before addition to the latex.

* * * * *